(12) United States Patent
Tan et al.

(10) Patent No.: US 7,514,817 B2
(45) Date of Patent: Apr. 7, 2009

(54) CONVERTING DEVICE WITH POWER FACTOR CORRECTING AND DC/DC CONVERTING FUNCTIONS

(75) Inventors: Jing-Tao Tan, Taoyuan Shien (TW); Zhi-Qiang Jiang, Taoyuan Shien (TW); Qiu-Hua Zhu, Taoyuan Shien (TW); Jian-Ping Ying, Taoyuan Shien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 428 days.

(21) Appl. No.: 11/385,066

(22) Filed: Mar. 21, 2006

(65) Prior Publication Data
US 2006/0214513 A1   Sep. 28, 2006

(30) Foreign Application Priority Data
Mar. 24, 2005   (TW) .............................. 94109199 A

(51) Int. Cl.
*H02J 9/00*   (2006.01)
(52) U.S. Cl. ........................................... 307/66
(58) Field of Classification Search .................... 307/66
See application file for complete search history.

(56) References Cited

U.S. PATENT DOCUMENTS

| | | | |
|---|---|---|---|
| 5,654,591 A | 8/1997 | Mabboux et al. | |
| 6,661,678 B2 | 12/2003 | Raddi et al. | |
| 2004/0036450 A1* | 2/2004 | Aiello et al. | 323/222 |
| 2005/0017805 A1* | 1/2005 | Smidt et al. | 330/251 |
| 2005/0029966 A1* | 2/2005 | Buonocunto | 315/291 |
| 2005/0270806 A1* | 12/2005 | Zhu | 363/17 |
| 2007/0138972 A1* | 6/2007 | Siessegger | 315/225 |

* cited by examiner

Primary Examiner—Stephen W Jackson
Assistant Examiner—Dru M Parries
(74) Attorney, Agent, or Firm—Volpe and Koenig P.C.

(57) ABSTRACT

A converting device with PFC and dc/dc converting functions is provided. The converting device includes a power source providing a dc voltage, an inverter having an input terminal electrically connected to the power source and an output terminal, a transformer having a primary winding electrically connected to the output terminal of the inverter and a secondary winding, a rectifier/filter circuit having an input terminal electrically connected to the secondary winding of the transformer and an output terminal, and a PFC converter coupled to the output terminal of the rectifier/filter circuit and having an input terminal receiving an ac input voltage. The converting device converts the ac input voltage into an ac output voltage when the ac input voltage is normal, and converts the dc voltage to output the ac output voltage with the cooperation of the inverter, the transformer, the rectifier/filter circuit and the PFC converter when the ac input voltage is abnormal.

18 Claims, 15 Drawing Sheets

80

90

100

110

120

140

_US 7,514,817 B2_

CONVERTING DEVICE WITH POWER FACTOR CORRECTING AND DC/DC CONVERTING FUNCTIONS

FIELD OF THE INVENTION

The present invention relates to a converting device with power factor correcting (PFC) and dc/dc converting functions, and more particularly to a converting device for an On-Line uninterruptible power supply (UPS).

BACKGROUND OF THE INVENTION

An On-Line UPS is usually operated in an on-line mode, a back-up mode and a bypass mode. When the On-Line UPS is operated in the On-Line mode, an ac output voltage is provided from a power source to a load through an inverter and a PFC converter. When the power source is abnormal and the UPS is operated in the back-up mode, the ac output voltage is provided from a battery to the load through the inverter and a dc/dc converter For safety consideration, the output voltage of the On-Line UPS has a common middle line with the inputted power source by the incorporation of an isolated transformer at the output terminal. However, for an On-Line UPS without the isolated transformer, the PFC converter and the dc/dc converter must be able to output a positive and a negative dc voltages which are electrically connected to the middle line of the power source. The operation principles are described in detail in U.S. Pat. Nos. 6,661,678 and 5,654,591, etc.

Please refer to FIG. 1, which is a circuit diagram showing a converting device with PFC and dc/dc converting functions according to the prior art. The converting device 10 includes a PFC converter and a dc/dc converter. The PFC converter is composed of an ac input voltage vac, a relay J1, a filtering inductor L3, two rectifying diodes D9 and D10, two power switches S3 and S4, two diodes D11 and D12, and two filtering capacitors C1 and C2. The dc/dc converter is composed of a battery VBat, two power switches S1 and S2, a transformer Tr, eight diodes D1~D8, two filtering inductors L1 and L2, and two filtering capacitors C1 and C2.

When the ac input voltage vac is provided normally, the relay J1 is switched to be electrically connected to the filtering inductor L3 so that the PFC converting function is achieved. When the ac input voltage vac is abnormal, the relay J1 is switched to be open to the filtering inductor L3 and the dc/dc converting function is then achieved by the dc/dc converter.

The positive bus voltage BUS+ and the negative bus voltage BUS− at the output terminal of the converting device 10 are inverted by the inverter into a low-frequency sinusoidal voltage and then outputted to the load. In the positive half cycle of the low-frequency sinusoidal voltage, the positive bus voltage BUS+ has an output power and the negative bus voltage BUS− does not. In the negative half cycle of the low-frequency sinusoidal voltage, the positive bus voltage BUS+ does not have an output power and the negative bus voltage BUS− does.

In the converting device shown in FIG. 1, the dc/dc converter and the PFC converter are two independent circuits. In the dc/dc converter, two circuits are adopted to be coupled to the secondary side of the transformer Tr to achieve a dual voltage output. The two circuits includes two secondary windings, two rectifying bridges composed of diodes D1~D8, and two filtering inductors L1 and L2. With the two circuits, the converting device is able to operate in the positive and negative half cycles of the low-frequency sinusoidal voltage while the dc/dc converting function runs.

However, the traditional converting device 10 has too many electrical elements and each electrical element has a low utility rate. Consequently, the manufacturing cost for the traditional converting device 10 is quite high.

SUMMARY OF THE INVENTION

It is therefore an aspect of the present invention to provide a converting device with power factor correcting and dc/dc converting functions for an On-Line uninterruptible power supply. A power factor correcting converter is used to assist in the dc/dc converting function of a dual voltage output in order to improve the back-up mode of the On-Line UPS. The electrical elements constituting the On-Line UPS and the manufacturing cost therefor will be reduced and the power density of the system will be increased.

According to the foregoing aspect of the present invention, a converting device with power factor correcting (PFC) and dc/dc converting functions is provided. The converting device includes a power source providing a dc voltage, an inverter having an input terminal electrically connected to the power source and an output terminal, a transformer having a primary winding electrically connected to the output terminal of the inverter and a secondary winding, a rectifier/filter circuit having an input terminal electrically connected to the secondary winding of the transformer and an output terminal, and a PFC converter coupled to the output terminal of the rectifier/filter circuit and having an input terminal receiving an ac input voltage. The converting device converts the ac input voltage into an ac output voltage when the ac input voltage is normal, and converts the dc voltage to output the ac output voltage with a cooperation of the inverter, the transformer, the rectifier/filter circuit and the PFC converter when the ac input voltage is abnormal.

Preferably, the power source is a battery.

Preferably, the inverter is a push-pull circuit including two gate-controlled switches having a reverse parallel-connected diode, each of the gate-controlled switches is a power MOSFET, and the reverse parallel-connected diode is a parasitic reverse parallel-connected diode of the power MOSFET.

Preferably, the inverter is a half-bridge circuit including two gate-controlled switches having a reverse parallel-connected diode and a parasitic capacitor respectively, each of the gate-controlled switches is a power MOSFET, and the reverse parallel-connected diode is a parasitic reverse parallel-connected diode of the power MOSFET.

Preferably, the inverter is a full-bridge circuit including four gate-controlled switches having a reverse parallel-connected diode, each of the gate-controlled switches is a power MOSFET, and the reverse parallel-connected diode is a parasitic reverse parallel-connected diode of the power MOSFET.

Preferably, the rectifier/filter circuit includes at least a bridge circuit.

Preferably, the rectifier/filter circuit further includes a first filtering inductor coupled to the bridge circuit.

Preferably, the bridge circuit is a full-wave circuit including two diodes.

Preferably, the bridge circuit is a current double circuit including two diodes.

Preferably, the bridge circuit is a full-bridge circuit including four diodes.

Preferably, the. PFC converter includes a relay electrically connected to the ac input voltage, a second parasitic inductor, four diodes, two capacitors and two gate-controlled switches having a reverse parallel-connected diode, each of the gate-controlled switches is a power MOSFET, and the reverse parallel-connected diode is a parasitic reverse parallel-connected diode of the power MOSFET.

Preferably, the relay is turned ON when the ac input voltage is normal, the converting device converts the ac input voltage to periodically output a positive bus voltage and a negative bus voltage with the cooperation of the second parasitic inductor, two of the four diodes, one of the two capacitors and one of the two gate-controlled switches with its reverse parallel-connected diode, the positive bus voltage and the negative bus voltage form the ac output voltage, each of the gate-controlled switches is a power MOSFET, and the reverse parallel-connected diode is a parasitic reverse parallel-connected diode of the power MOSFET.

Preferably, the relay is turned OFF when the ac input voltage is abnormal, the converting device converts the dc voltage to periodically output a positive bus voltage and a negative bus voltage with the cooperation of one of the four diodes, one of the two capacitors and one of the two gate-controlled switches with its reverse parallel-connected diode, each of the gate-controlled switches is a power MOSFET, and the reverse parallel-connected diode is a parasitic reverse parallel-connected diode of the power MOSFET.

According to the foregoing aspect of the present invention, an On-Line uninterruptible power supply (UPS) is provided. The On-Line UPS includes at least the converting device with power factor correcting and dc/dc converting functions.

According to the foregoing aspect of the present invention, an operating method for an On-Line uninterruptible power supply (UPS) is provided. The On-Line UPS includes a power source providing a dc voltage, an inverter, a transformer, a rectifier/filter circuit and a PFC converter electrically connected to an ac input voltage. The operating method includes steps of (a) converting the ac input voltage into an ac output voltage with the PFC converter when the ac input voltage is normal, and (b) converting the dc voltage to output the ac output voltage with a cooperation of the inverter, the transformer, the rectifier/filter circuit and the PFC converter when the ac input voltage is abnormal.

Preferably, the step (a) further includes a step of periodically outputting a positive bus voltage and a negative bus voltage to form the ac output voltage according to a time-series variation of the ac input voltage.

Preferably, the step (b) further includes a step of converting the dc voltage into a sinusoidal voltage and periodically outputting a positive bus voltage and a negative bus voltage to form the ac output voltage according to a time-series variation of the sinusoidal voltage.

Preferably, the step (b) further includes a step of pulse width modulating (PWM) the PFC converter to periodically output a positive bus voltage and a negative bus voltage to form the ac output voltage.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

◎ The Representative Circuit of the Present Invention

Figure 1:
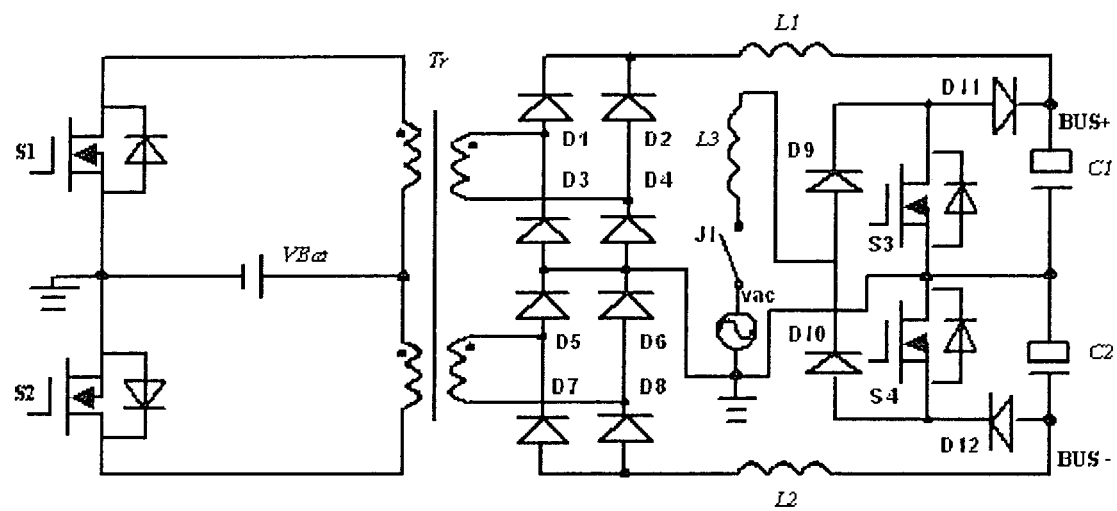
FIG. 1 is a circuit diagram showing a converting device with PFC and dc/dc converting functions according to the prior art.
Figure 2:
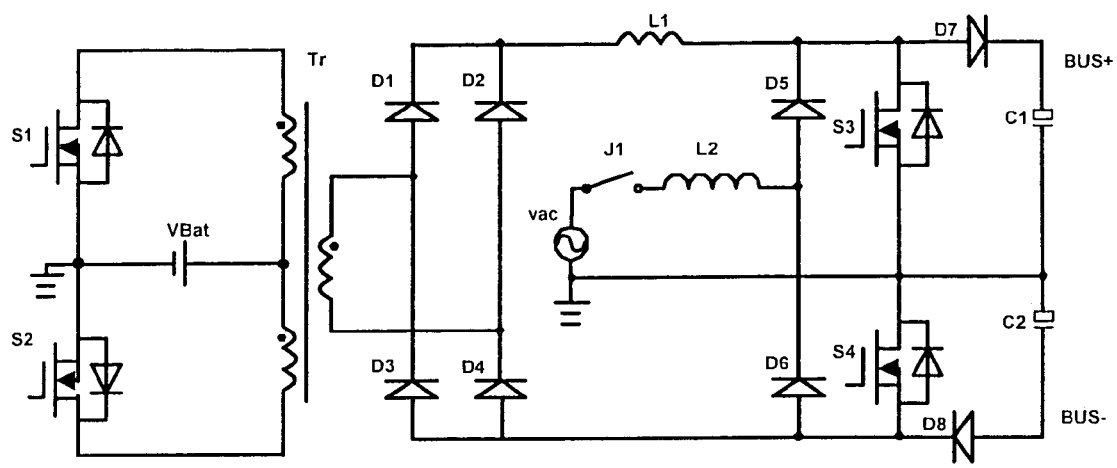
FIG. 2 is a circuit diagram showing a converting device with PFC and dc/dc converting functions according to the present invention.

Please refer to FIG. 2, which is a circuit diagram showing a converting device with PFC and dc/dc converting functions according to the present invention. The converting device 20 includes a power source VBat, an inverter composed of two gate-controlled switches S1 and S2 with their respective reverse parallel-connected diodes, a transformer Tr, a rectifier/filter circuit composed of four diodes D1~D4 and a filtering inductor L1, an a power factor correcting converter. The PFC converter includes a relay J1 electrically connected to an ac input voltage vac, a filtering inductor L2, four diodes D5~D8, two gate-controlled switches S3 and S4 with their respective reverse parallel-connected diodes, and two capacitors C1 and C2.

A dc voltage is provided from the power source VBat. An input terminal of the inverter is electrically connected to the power source VBat and an output terminal of the inverter is electrically connected to a primary side of the transformer Tr. A secondary side of the transformer Tr is electrically connected to a bridge circuit including the four diodes D1~D4. Although the power source VBat is implemented by a battery in the embodiment, it is also replaceable by other power source elements with the same power storage function. The gate-controlled switches are all implemented by power MOSFETs in the embodiment. Similarly, each reverse parallel-connected diode can be a parasitic reverse parallel-connected diode of the power MOSFET.

The operations of the converting device 20 in the on-line mode and in the back-up mode are described in detail as follows.

(1) The Operation in the On-line Mode

When the ac input voltage vac in FIG. 2 is normal, the relay J1 is turned ON. The converting device 20 is operated in the on-line mode. At this time, the power MOSFETs S1 and S2 are cut off. The equivalent circuit of the converting device 20 is shown as the PFC converter 30 of FIG. 3.

Figure 3:
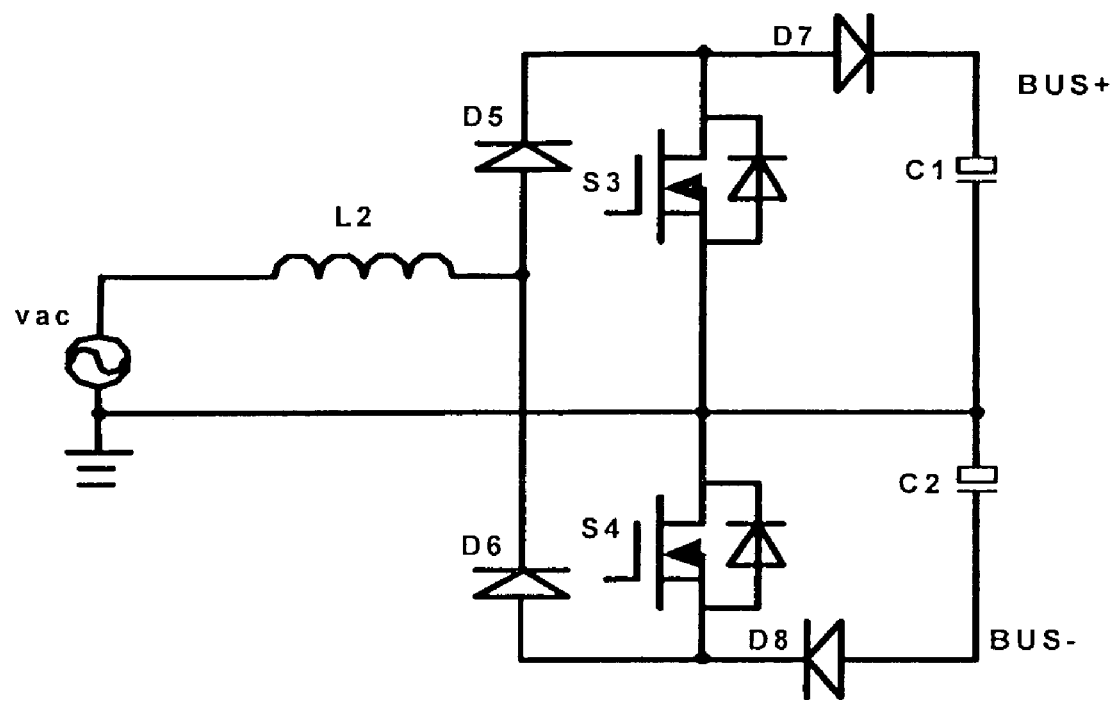
FIG. 3 is an equivalent circuit diagram showing the converting device 20 operated in the on-line mode according to the present invention.

Please refer to FIG. 3, which is an equivalent circuit diagram showing the converting device 20 operated in the on-line mode according to the present invention. As shown, the PFC converter 30 includes a filtering inductor L2, two rectifying diodes D5 and D6, two power MOSFETs S3 and S4, two fast recovery diodes D7 and D8, and two capacitors C1 and C2.

When the ac input voltage vac is positive, the ac input voltage vac is converted into a positive bus voltage BUS+ by a boost PFC converter composed of a filtering inductor L2, a rectifying diode D5, a power MOSFET S3, a fast recovery diode D7, and a capacitor C1. When the ac input voltage vac is negative, the ac input voltage vac is converted into a negative bus voltage BUS− by a boost PFC converter composed of the filtering inductor L2, a rectifying diode D6, a power MOSFET S4, a fast recovery diode D8, and a capacitor C2. In this way, the positive and negative bus voltages provided periodically result in an ac output voltage at the output terminal of the converting device 20.

(2) The Operation in the Back-up Mode

When the ac input voltage vac in FIG. 2 is abnormal, the relay J1 is turned OFF. The converting device 20 is operated in the back-up mode. At this time, the power MOSFETs S1 and S2 are turned ON. The equivalent circuit of the converting device 20 is shown as the dc/dc converter 40 of FIG. 4.

Figure 4:
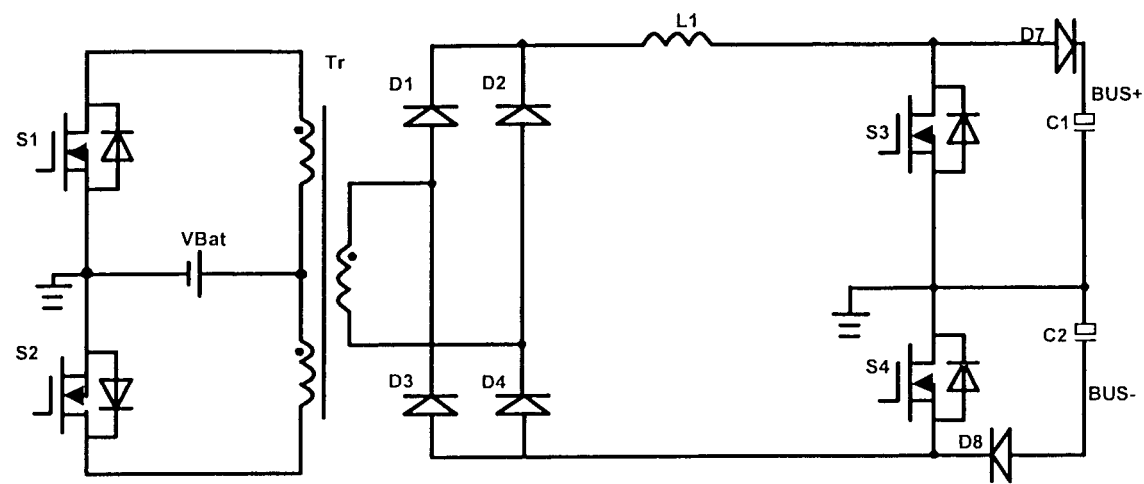
FIG. 4 is an equivalent circuit diagram showing the converting device 20 operated in the back-up mode according to the present invention.

Please refer to FIG. 4, which is an equivalent circuit diagram showing the converting device 20 operated in the back-up mode according to the present invention. As shown, the dc/dc converter 40 includes two power MOSFETs S1 and S2, a transformer Tr, four fast recovery diodes D1~D4, a filtering inductor L1, two power MOSFETs S3 and S4, two fast recovery diodes D7 and D8, and two capacitors C1 and C2.

For the whole circuit, the dc voltage from the battery VBat is firstly converted into the positive and negative bus voltages BUS+, BUS− by the rectifier/filter circuit composed of the transformer Tr, the four diodes D1~D4, and the filtering inductor L1. The bus voltages are inverted into a low-frequency sinusoidal voltage by the inverter and then outputted to a load. In detail, in the positive half cycle of the low-frequency sinusoidal voltage, the positive bus voltage BUS+ has an output power and the negative bus voltage BUS− does not. Contrarily, in the negative half cycle of the low-frequency sinusoidal voltage, the positive bus voltage BUS+ does not have an output power and the negative bus voltage BUS− does.

The operation procedures of the dc/dc converter 40 are described as follows.

Figure 5:
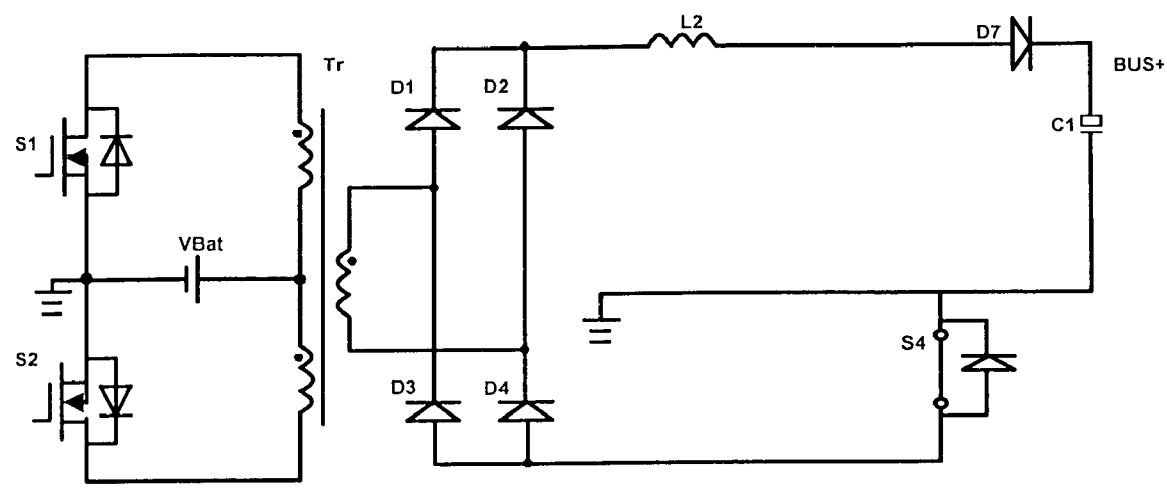
FIG. 5 is an equivalent circuit diagram showing the dc/dc converter 40 outputting a positive bus voltage according to the present invention.

(a) In the positive half cycle of the low-frequency sinusoidal voltage, the power MOSFETs S1 and S2 are operated through the pulse width modulation (PWM). The power MOSFET S3 is turned OFF and the power MOSFET S4 is turned ON. A positive bus voltage BUS+ is therefore outputted from the dc/dc converter 40. The equivalent circuit of the dc/dc converter 40 outputting a positive bus voltage is shown in FIG. 5.

Figure 6:
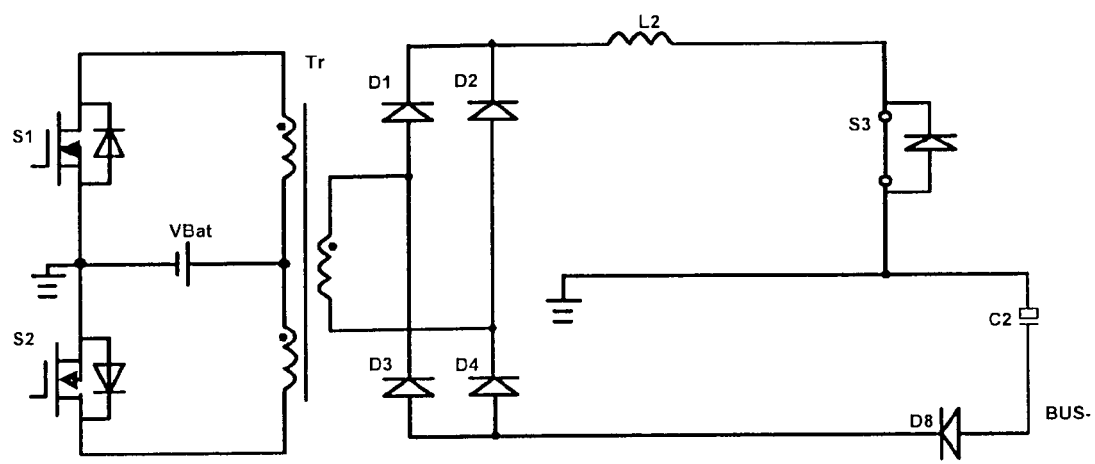
FIG. 6 is an equivalent circuit diagram showing the dc/dc converter 40 outputting a negative bus voltage according to the present invention.

(b) In the negative half cycle of the low-frequency sinusoidal voltage, the power MOSFETs S1 and S2 are operated through the PWM. The power MOSFET S3 is turned ON and the power MOSFET S4 is turned OFF. A negative bus voltage BUS− is therefore outputted from the dc/dc converter 40. The equivalent circuit of the dc/dc converter 40 outputting a negative bus voltage is shown in FIG. 6.

Besides the aforementioned operation principle, there is still another one for the dc/dc converter 40 with the same circuit configuration. That is, the power MOSFETs S1 and S2 are operated through the PWM and the power MOSFETs S3 and S4 are pulse width modulated so that the positive and negative bus voltages BUS+ and BUS− are outputted periodically.

In the converting device 10 of the prior art, two circuits are adopted to be coupled to the secondary side of the transformer Tr to achieve the dc/dc converting function of dual voltage outputting. The two circuits includes two secondary windings, two rectifying bridges composed of diodes D1~D8, and two filtering inductors L1 and L2. Compared to the converting device 10 of the prior art, in the present invention, only one secondary winding, one rectifying bridge composed of diodes D1~D4, and one filtering inductor are adopted to be coupled to the secondary side of the transformer Tr so that a dc voltage is generated. Then the dc voltage is converted into a dual dc voltage for achieving the dc/dc converting function of dual voltage outputting, by the power MOSFETs S3 and S4 of the original PFC converter and the fast recovery diodes D7 and D8.

◎ Other Modifications of the Present Invention

So far, the converting device with power factor correcting and dc/dc converting functions of the present invention has been described with reference to FIG. 2. In fact, the converting device 20 of FIG. 2 can also be modified as the circuit topology shown in FIG. 7.

Figure 7:
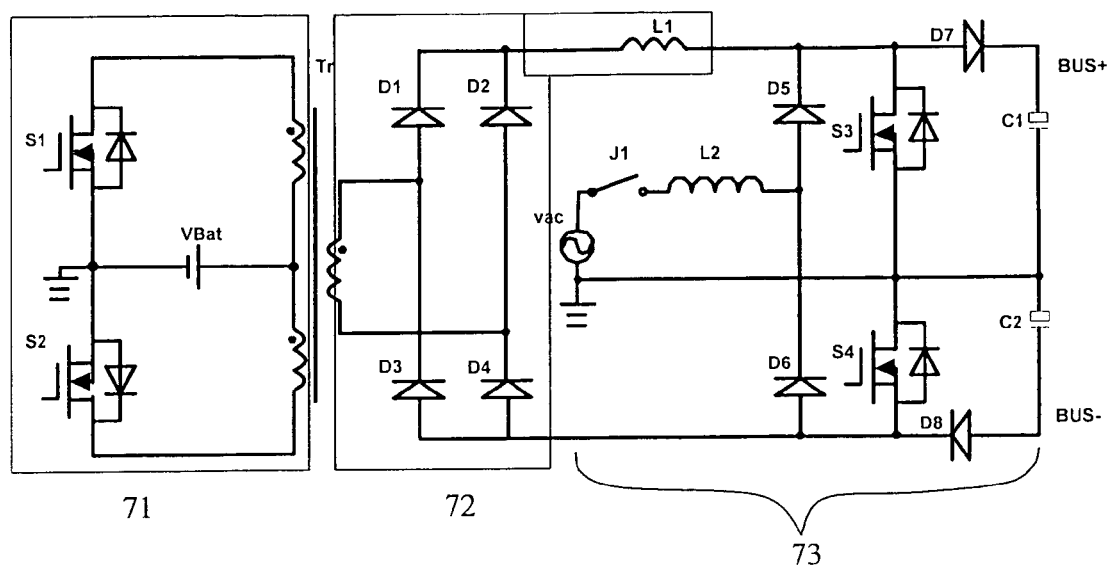
FIG. 7 is circuit block diagram showing the converting device 20 of FIG. 2 according to the present invention.

Please refer to FIG. 7, which is a circuit block diagram showing the converting device 20 of FIG. 2 according to the present invention. The converting device 70 includes an inverter 71, a rectifier/filter circuit 72 and a PFC converter 73. Depending upon the type of the inverter 71, the rectifier/filter circuit 72 can include the first filtering inductor or not.

Other modifications of the inverter 71 and the rectifier/filter circuit 72 are described as follows.

Figure 8:
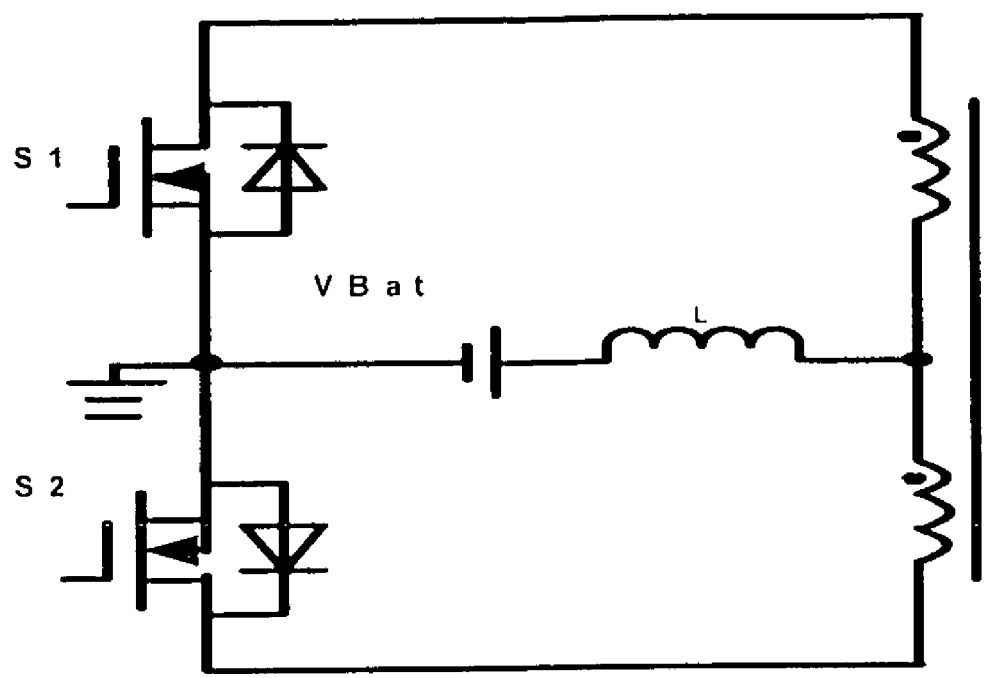
FIG. 8 is a push-pull topology of the inverter of FIG. 7 according to the present invention.

(i) The inverter 71 in FIG. 7 is of a push-pull topology. Another push-pull topology 80 of the inverter 71 is shown in FIG. 8. Compared to the inverter 71 in FIG. 7, an inductor L is electrically connected between the battery VBat and the primary side of the transformer Tr in the push-pull circuit 80.

Figure 9:
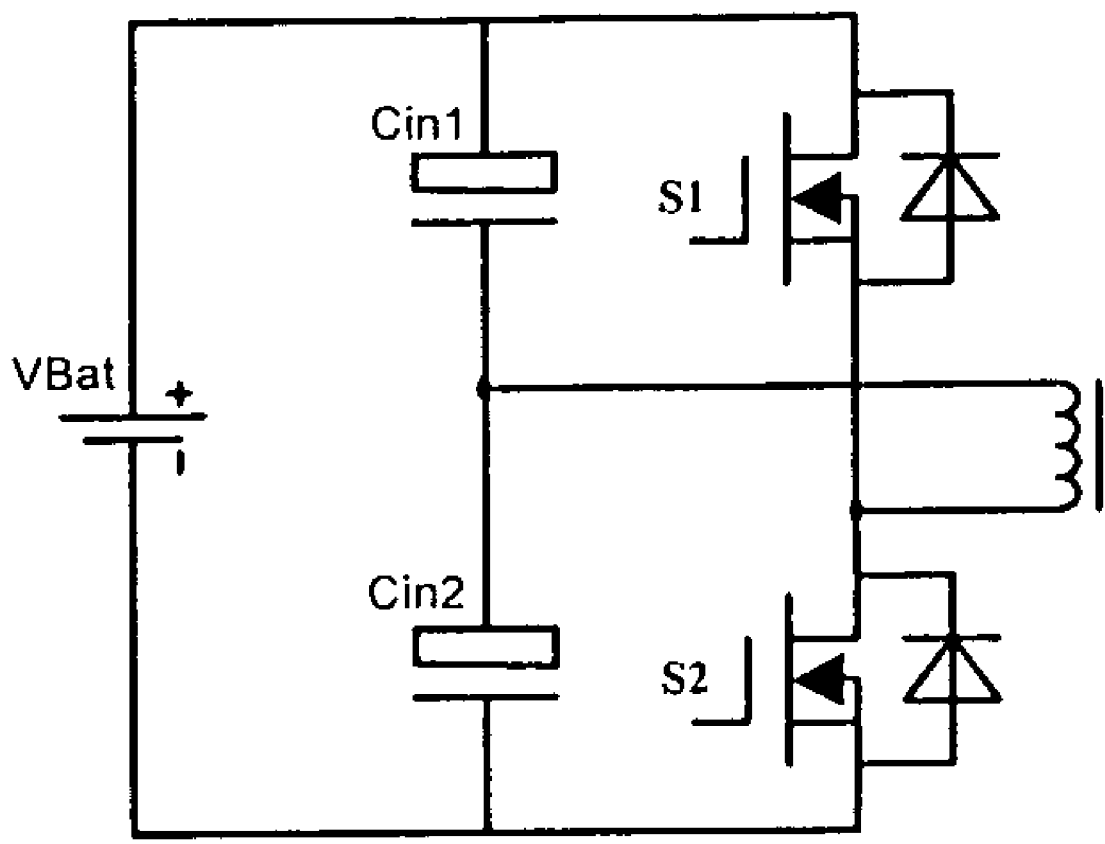
FIG. 9 is a half-bridge topology of the inverter of FIG. 7 according to the present invention.

(ii) The inverter 71 in FIG. 7 is of a push-pull topology. Another half-bridge topology 90 of the inverter 71 is shown in FIG. 9. The half-bridge circuit 90 includes two power MOSFETs S1 and S2 with their respective reverse parallel-connected diodes, and two parasitic capacitors Cin1 and Cin2.

Figure 10:
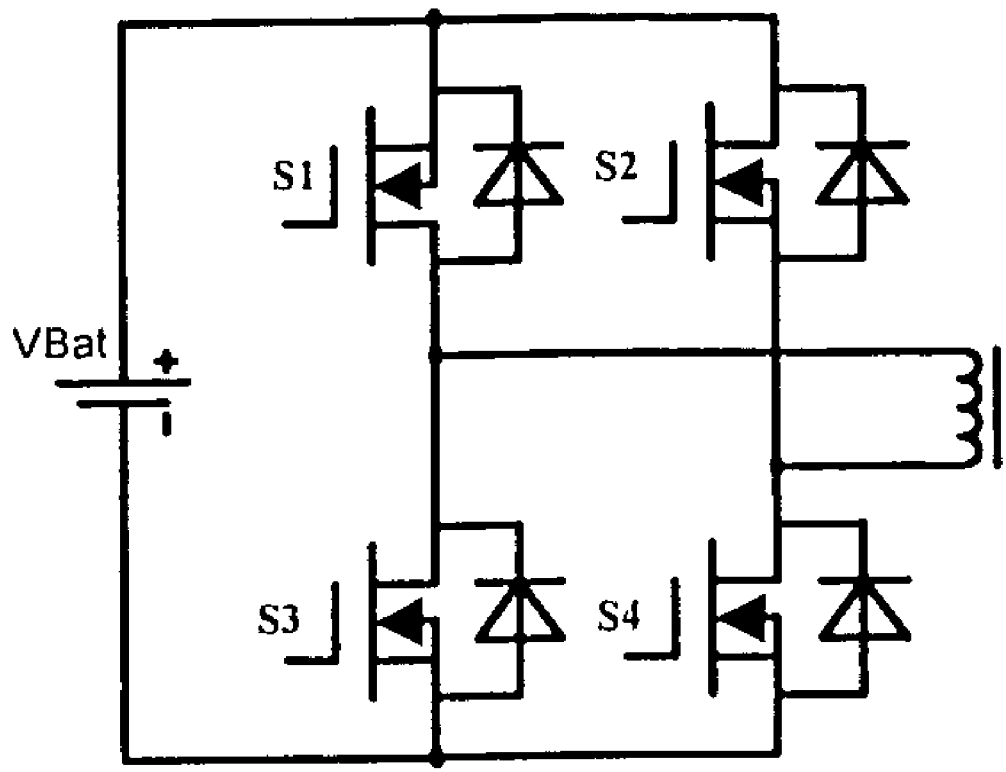
FIG. 10 is a full-bridge topology of the inverter of FIG. 7 according to the present invention.

(iii) The inverter 71 in FIG. 7 is of a push-pull topology. Another full-bridge topology 100 of the inverter 71 is shown in FIG. 10. The full-bridge circuit 100 includes four power MOSFETs S1~S4 with their respective reverse parallel-connected diodes.

Figure 11:
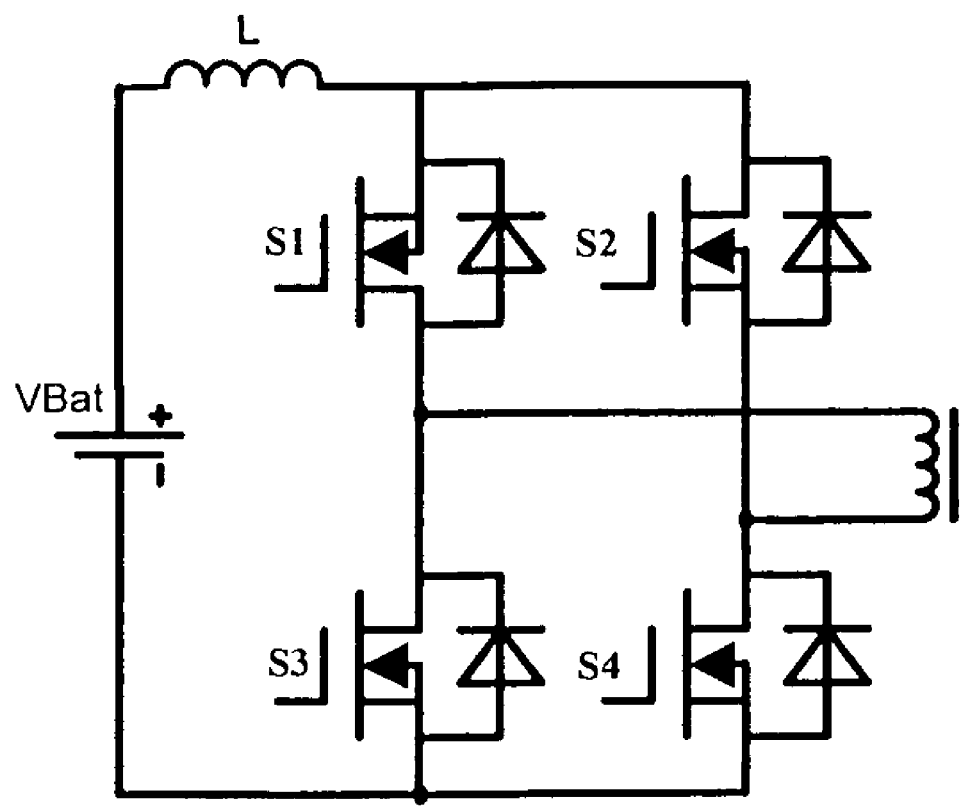
FIG. 11 is another full-bridge topology of the inverter of FIG. 7 according to the present invention.

(iv) The inverter 71 in FIG. 7 is of a push-pull topology. Another full-bridge topology 110 of the inverter 71 is shown in FIG. 11. Compared to the full-bridge circuit 100, the full-bridge circuit 110 includes an inductor L additionally.

Figure 12:
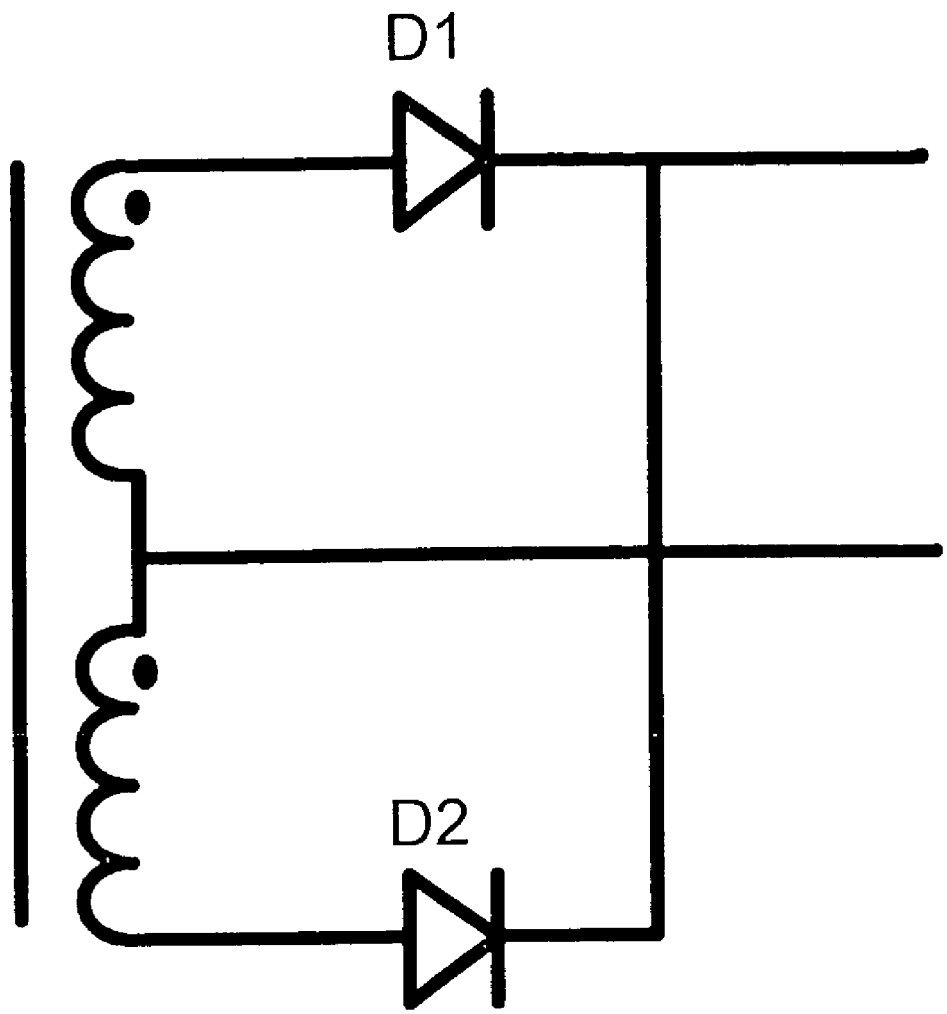
FIG. 12 is a full-wave topology of the rectifier/filter circuit of FIG. 7 according to the present invention.

(v) The rectifier/filter circuit 72 in FIG. 7 is of a full-bridge topology. Another full-wave topology 120 of the rectifier/filter circuit 72 is shown in FIG. 12. The full-wave circuit 120 includes two diodes D1 and D2.

Figure 13:
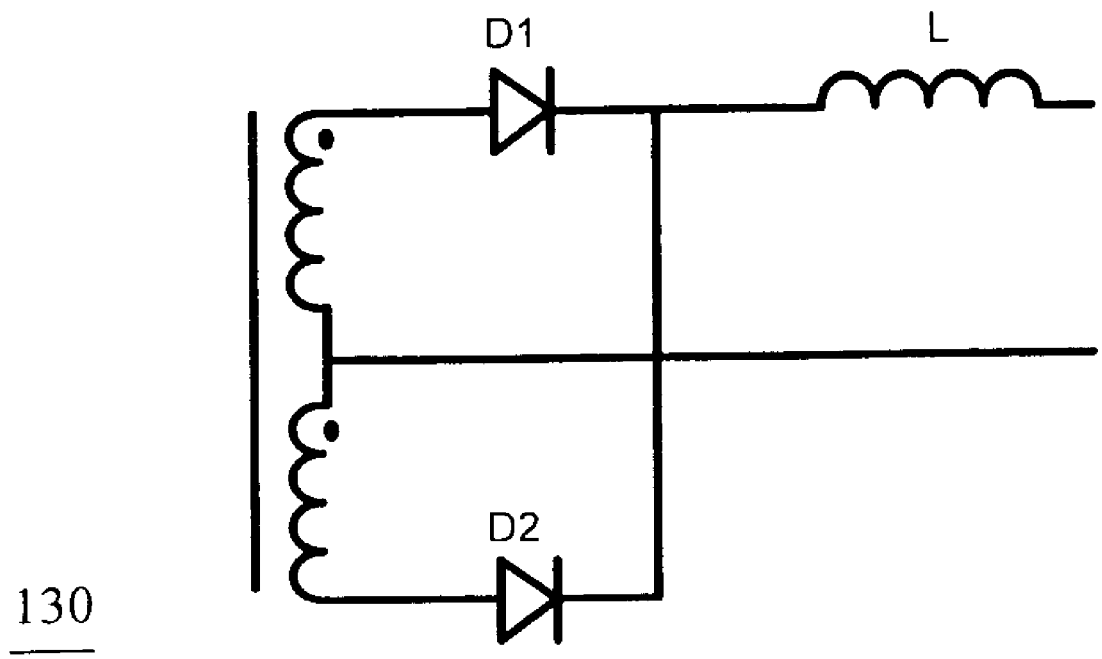
FIG. 13 is another full-wave topology of the rectifier/filter circuit of FIG. 7 according to the present invention.

(vi) The rectifier/filter circuit 72 in FIG. 7 is of a full-bridge topology. Another full-wave topology 130 of the rectifier/filter circuit 72 is shown in FIG. 13. Compared to the full-wave circuit 120, the full-wave circuit 130 includes a first filtering inductor L additionally.

Figure 14:
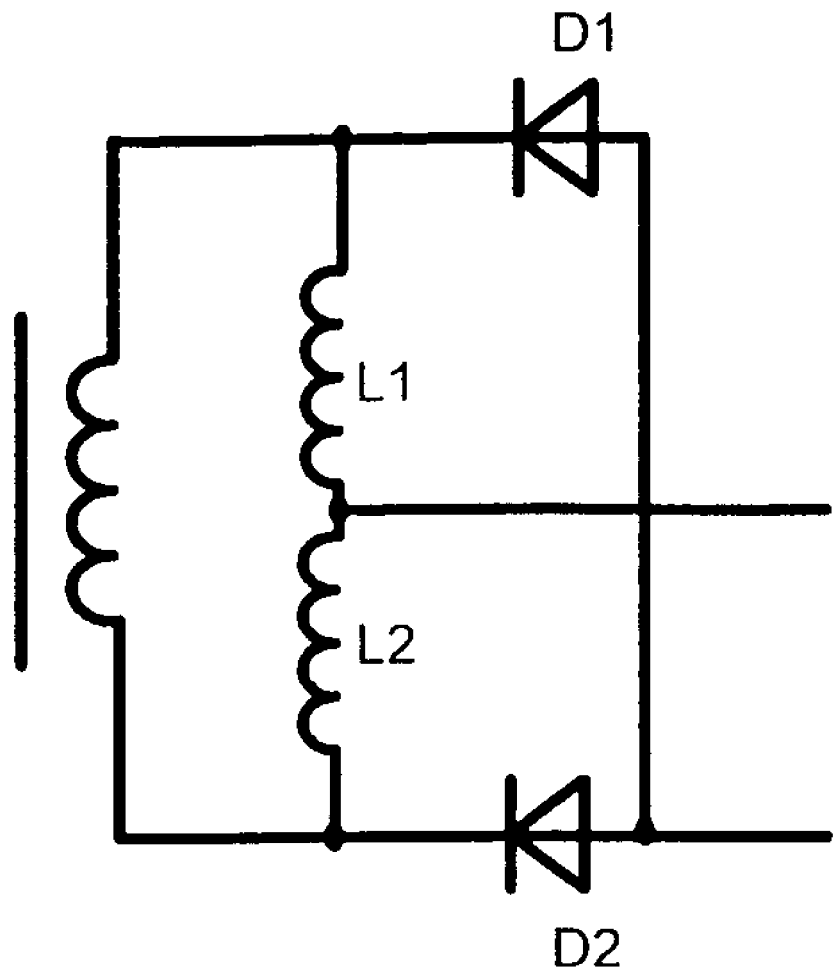
FIG. 14 is a current double topology of the rectifier/filter circuit of FIG. 7 according to the present invention.

(vii) The rectifier/filter circuit 72 in FIG. 7 is of a full-bridge topology. Another current double topology 140 of the rectifier/filter circuit 72 is shown in FIG. 14. The current double circuit 140 includes two diodes D1 and D2 and two filtering inductors L1 and L2.

Figure 15:
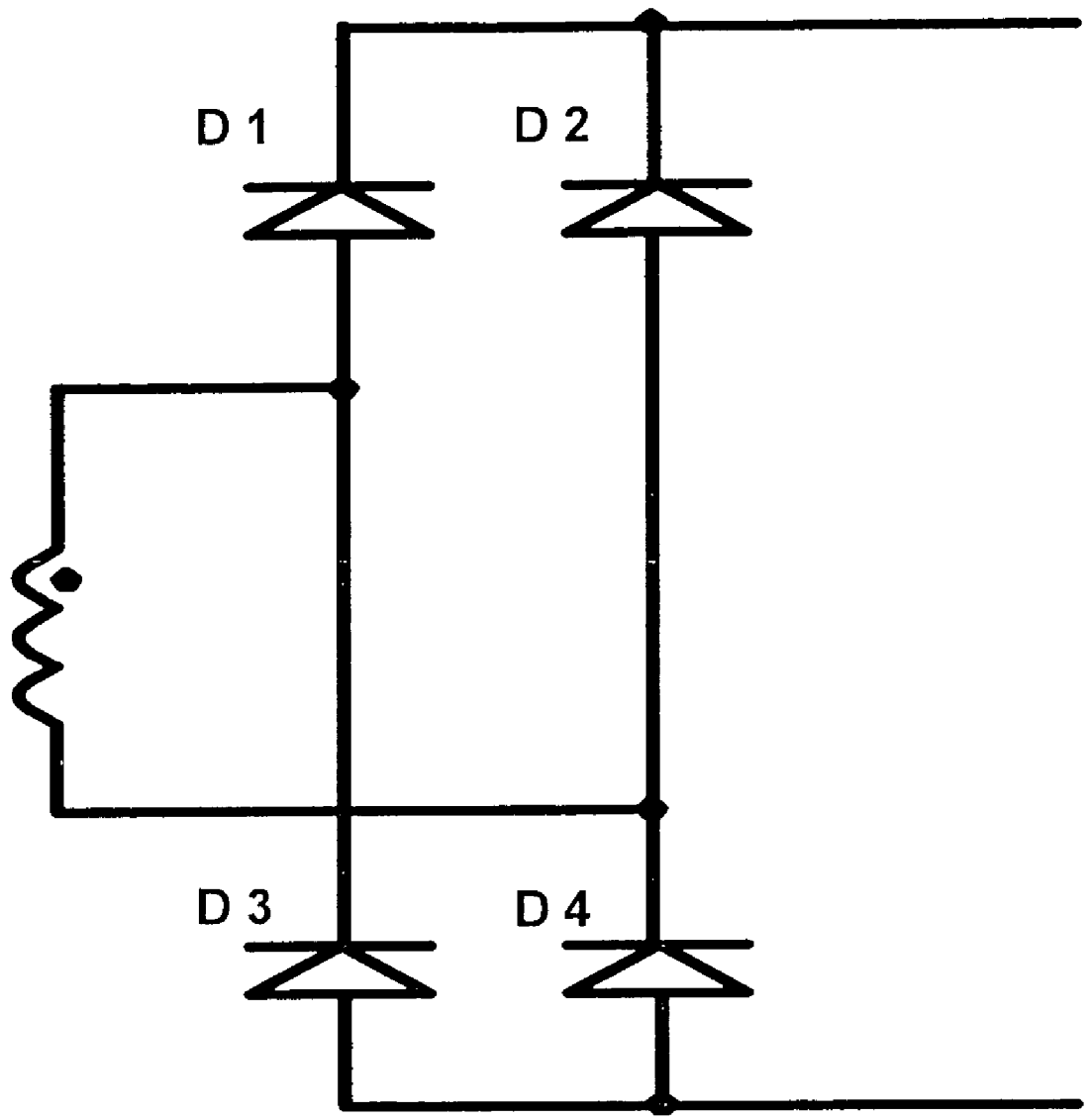
FIG. 15 is a full-bridge topology of the rectifier/filter circuit of FIG. 7 according to the present invention.

(viii) The rectifier/filter circuit 72 in FIG. 7 is of a full-bridge topology. Another full-bridge topology 150 of the rectifier/filter circuit 72 is shown in FIG. 15. Compared to the full-bridge circuit 72, the first filtering inductor L1 is removed in the full-bridge circuit 150.

In conclusion, the main object of the present invention is to provide a converting device with power factor correcting and dc/dc converting functions. Another object of the present invention is to provide an On-Line UPS with power factor correcting and dc/dc converting functions. A further object of the present invention is to provide an operating method for the On-Line UPS. Compared to the converting device of the prior art, the converting device of the present invention has fewer electrical elements and a much more simplified circuit configuration. The inherent PFC converter is used to achieve the dc/dc converting function of dual voltage outputting. Hence, the power density of the system is improved and the manufacturing cost is reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A converting device with power factor correcting (PFC) and dc/dc converting functions, comprising:
    a power source providing a dc voltage;
    an inverter having an input terminal electrically connected to said power source and an output terminal;
    a transformer having a primary winding electrically connected to said output terminal of said inverter and a secondary winding;
    a rectifier/filter circuit having an input terminal electrically connected to said secondary winding of said transformer and a first and a second output terminals; and
    a PFC converter coupled to said first and said second output terminals of said rectifier/filter circuit, having an input terminal receiving an ac input voltage and a first and a second output terminals, and comprising:
    a first diode having an anode electrically connected to said first output terminal of said rectifier/filter circuit and a cathode electrically connected to said first output terminal of said PFC converter; and
    a second diode having a cathode electrically connected to said second output terminal of said rectifier/filter circuit and an anode electrically connected to said second output terminal of said PFC converter,
    wherein said converting device converts said ac input voltage into an ac output voltage when said ac input voltage is normal, and converts said dc voltage to output said ac output voltage with a cooperation of said inverter, said transformer, said rectifier/filter circuit and said PFC converter and with a conduction of one of said first and said second diodes when said ac input voltage is abnormal.

2. The converting device with power factor correcting and dc/dc converting functions as claimed in claim 1, wherein said power source is a battery.

3. The converting device with power factor correcting and dc/dc converting functions as claimed in claim 1, wherein said inverter is a push-pull circuit comprising two gate-controlled switches having a reverse parallel-connected diode, each of said gate-controlled switches is a power MOSFET, and said reverse parallel-connected diode is a parasitic reverse parallel-connected diode of said power MOSFET.

4. The converting device with power factor correcting and dc/dc converting functions as claimed in claim 1, wherein said inverter is a half-bridge circuit comprising two gate-controlled switches having a reverse parallel-connected diode and a parasitic capacitor respectively, each of said gate-controlled switches is a power MOSFET, and said reverse parallel-connected diode is a parasitic reverse parallel-connected diode of said power MOSFET.

5. The converting device with power factor correcting and dc/dc converting functions as claimed in claim 1, wherein said inverter is a full-bridge circuit comprising four gate-controlled switches having a reverse parallel-connected diode, each of said gate-controlled switches is a power MOSFET, and said reverse parallel-connected diode is a parasitic reverse parallel-connected diode of said power MOSFET.

6. The converting device with power factor correcting and dc/dc converting functions as claimed in claim 1, wherein said rectifier/filter circuit comprises at least a bridge circuit.

7. The converting device with power factor correcting and dc/dc converting functions as claimed in claim 6, wherein said rectifier/filter circuit further comprises a first filtering inductor coupled to said bridge circuit.

8. The converting device with power factor correcting and dc/dc converting functions as claimed in claim 6, wherein said bridge circuit is a full-wave circuit comprising two diodes.

9. The converting device with power factor correcting and dc/dc converting functions as claimed in claim 6, wherein said bridge circuit is a current double circuit comprising two diodes.

10. The converting device with power factor correcting and dc/dc converting functions as claimed in claim 6, wherein said bridge circuit is a full-bridge circuit comprising four diodes.

11. The converting device with power factor correcting and dc/dc converting functions as claimed in claim 1, wherein said PFC converter comprises a relay electrically connected to said ac input voltage, a second parasitic inductor, said first, said second, a third and a fourth diodes, two capacitors and two gate-controlled switches having a reverse parallel-connected diode, each of said gate-controlled switches is a power MOSFET, and said reverse parallel-connected diode is a parasitic reverse parallel-connected diode of said power MOSFET.

12. The converting device with power factor correcting and dc/dc converting functions as claimed in claim 11, wherein said relay is turned ON when said ac input voltage is normal, said converting device converts said ac input voltage to periodically output a positive bus voltage and a negative bus voltage with the cooperation of said second parasitic inductor, two of said first, and said second, said third and said fourth diodes, one of said two capacitors and one of said two gate-controlled switches with its reverse parallel-connected diode, said positive bus voltage and said negative bus voltage form said ac output voltage, each of said gate-controlled switches is a power MOSFET, and said reverse parallel-connected diode is a parasitic reverse parallel-connected diode of said power MOSFET.

13. The converting device with power factor correcting and dc/dc converting functions as claimed in claim 11, wherein said relay is turned OFF when said ac input voltage is abnormal, said converting device converts said dc voltage to periodically output a positive bus voltage and a negative bus voltage with the cooperation of one of said first and said second diodes, one of said two capacitors and one of said two gate-controlled switches with its reverse parallel-connected diode, each of said gate-controlled switches is a power MOSFET, and said reverse parallel-connected diode is a parasitic reverse parallel-connected diode of said power MOSFET.

14. An On-Line uninterruptible power supply (UPS) comprising at least said converting device with power factor correcting and dc/dc converting functions as claimed in claim 1.

15. An operating method for an On-Line uninterruptible power supply (UPS) comprising a power source providing a dc voltage, an inverter, a transformer, a rectifier/filter circuit having a first and a second output terminals and a PFC converter electrically connected to an ac input voltage and having a first and a second output terminals, the operating method comprising steps of:

(a) converting said ac input voltage into an ac output voltage with said PFC converter when said ac input voltage is normal; and (b) converting said dc voltage to output said ac output voltage with a cooperation of said inverter, said transformer, said rectifier/filter circuit and said PFC converter and with a conduction of one of a first and a second diodes when said ac input voltage is abnormal, wherein said PFC converter comprises:

said first diode having an anode electrically connected to said first output terminal of said rectifier/filter circuit and a cathode electrically connected to said first output terminal of said PFC converter: and said second diode having a cathode electrically connected to said second output terminal of said rectifier/filter circuit and an anode electrically connected to said second output terminal of said PFC converter.

16. The operating method for an On-Line UPS as claimed in claim 15, wherein said step (a) further comprises a step of periodically outputting a positive bus voltage and a negative bus voltage to form said ac output voltage according to a time-series variation of said ac input voltage.

17. The operating method for an On-Line UPS as claimed in claim 15, wherein said step (b) further comprises a step of converting said dc voltage into a sinusoidal voltage and periodically outputting a positive bus voltage and a negative bus voltage to form said ac output voltage according to a time-series variation of said sinusoidal voltage.

18. The operating method for an On-Line UPS as claimed in claim 15, wherein said step (b) further comprises a step of pulse width modulating (PWM) said PFC converter to periodically output a positive bus voltage and a negative bus voltage to form said ac output voltage.

* * * * *